April 11, 1961  G. S. HARTLEY ET AL  2,979,075
SPRAYING DEVICE

Filed July 2, 1956  4 Sheets-Sheet 2

INVENTORS
G. S. HARTLEY,
R. T. BRUNSKILL &
R. K. PFEIFFER
BY
ATTORNEYS

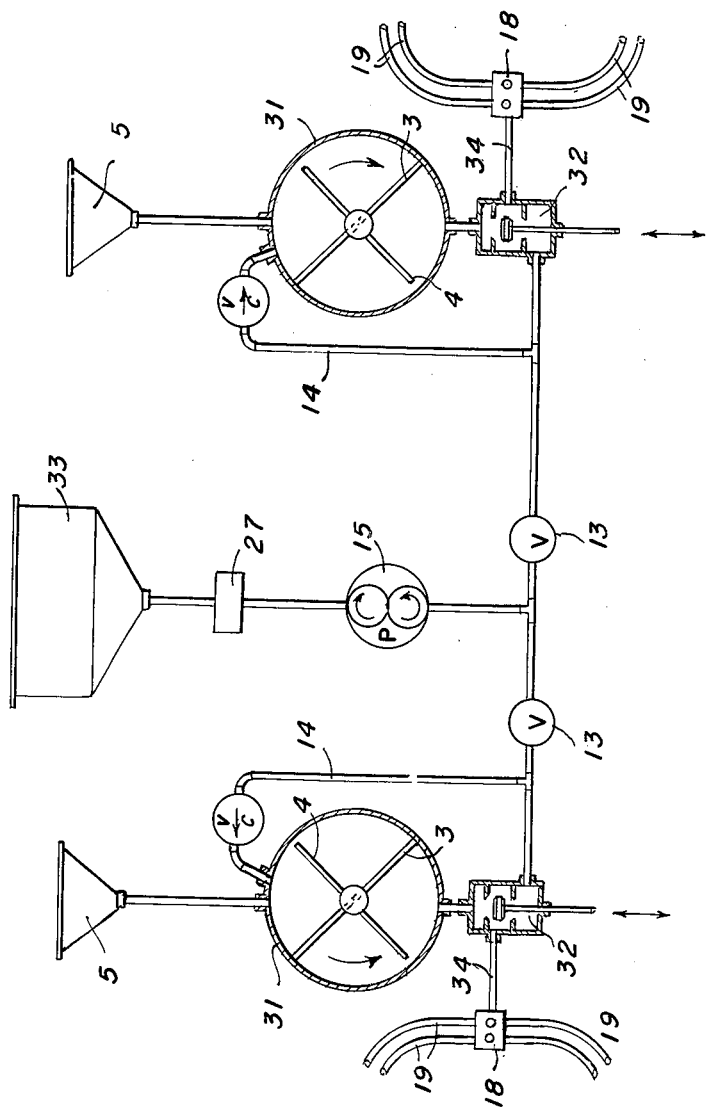

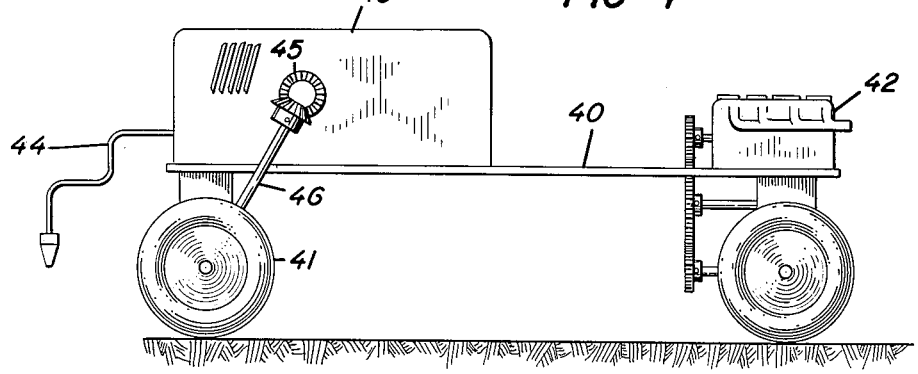
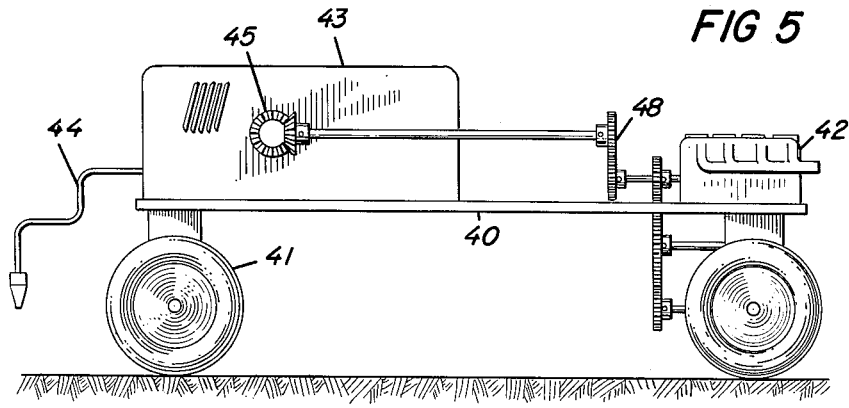

United States Patent Office
2,979,075
Patented Apr. 11, 1961

2,979,075

SPRAYING DEVICE

Gilbert Spencer Hartley, Fulbourn, and Robert Thompson Brunskill and Rudolf Koloman Pfeiffer, Cambridge, England, assignors to Fisons Pest Control Limited, Bourn, England Filed July 2, 1956, Ser. No. 595,400

Claims priority, application Great Britain July 2, 1955

15 Claims. (Cl. 137—351)

In the evaluation in small plot and field experiments of spray chemicals which produce lethal or modifying effects on plants, it is necessary of course to experiment with different dosages so as to ascertain the range of dosage within which the desired effects occur, and to test whether this range requires alteration according to the age of the crop, fertility of soil, weather, etc.

The conventional method of carrying out such investigations involves the spraying of separate plots with a knapsack or mechanical sprayer, using different dilutions of the spray chemical on the various plots. In this procedure a large fraction of the time of the experimenter is devoted to making up his dilutions and washing out his machine.

Described below is the design of a machine adapted to abbreviate the procedure, with considerable economy in time and labour. It has other advantages which are referred to below.

The principle of the machine incorporates many of the features of a conventional crop spraying machine. It is mounted on a tractor or trailer, the liquid is pumped out on to the crop through a pump geared to the power take-off of the tractor or to a land wheel so that the rate of delivery of the pump is over small changes of speed approximately proportional to the speed of the machine, and it discharges the liquid through a series of nozzles mounted on a conventional type of spray boom.

Instead however of supplying the liquid to the nozzles along a common pipe out of which they all lead, the nozzles are all fed from a common manifold distributor through individual tubes, the spray boom being relegated to the single function of supporting the nozzles. The leading tubes are all of the same length and diameter, so that the time of passage of any element of liquid from the common manifold to the separate nozzles is the same.

Instead of pumping already diluted liquid from a single supply tank to the nozzles, liquid is pumped from an intermediate concentrate vessel through the manifold above mentioned. The concentrate vessel is initially filled with a dilution of a spray chemical at a higher concentration than the maximum likely to have an effect of interest and is connected to a supply tank containing the diluent, normally water. During operation the concentrate vessel is otherwise closed and its contents are maintained homogeneous by a rapid and efficient mechanical agitator. As concentrate is withdrawn from this vessel via the manifold to the nozzles, its volume is necessarily replaced by diluent from the supply tank and therefore the concentration continuously decreases in an exponential manner. The nozzles are matched with regard to output rate at a given pressure and their leading tubes are of equal length and diameter so that a given concentration reaches all of them simultaneously. Moving over a plot the machine therefore delivers a band of spray uniform transversely but of exponentially decreasing concentration along the length of the band. The exponential decrease is desirable since biological effects are more related to relative than absolute changes of concentration, and the concentration changes by the same ratio for any given distance along the band.

The invention therefore provides, in a spraying machine of the kind described, a supply tank for the diluent, a closed vessel for the spray concentrate to be gradually diluted, means for filling that vessel, means for agitating the liquid in that vessel, a manifold, tubes suitably of substantially equal length and width leading from each opening of the manifold to one of a number of spray nozzles spaced regularly on a suitable support; a feed pipe from the supply tank to the concentrate vessel; an outlet pipe from the concentrate vessel to the manifold; stopcocks or valves in the connecting pipes where required; means working in step with the travelling speed of the machine to force diluent from the supply tank to the concentrate vessel, and at the same rate to force the gradually diluted concentrate from the concentrate vessel through the manifold, distributor tubes and nozzles on to the plot.

The concentrate may be a true solution or it may be an emulsion or suspension of the spray chemical; accordingly, the word "diluent" stands for "solvent" as well as for "non-solvent"; the diluent will normally be water.

There should be no mixing of liquid from the concentrate vessel back into the leading tube from the supply tank. This can be ensured by inserting a coarse porous plug in this tube, if the concentrate is denser than the diluting liquid. Alternatively, with the advantage that density is then unimportant, this tube can be fitted with a pressure-loaded valve opening only when the pump is caused to operate through the concentrate vessel.

In the normal case of the diluent being denser than the concentrate, the diluent will be arranged to enter the concentrate vessel near the top, and the concentrate to leave the vessel near the bottom.

The means for transporting the liquid through the system will be normally a pump geared to the power take-off or to a land wheel of the vehicle; and it will be arranged preferably between the outlet of the concentrate vessel and the manifold. Other conventional means for transporting liquids are not excluded; e.g. comprsssed air may be used, with the compressor drive in step with the land speed of the vehicle.

In order to permit filling of the concentrate vessel, it may be fitted with a stopcock on the exit tube, and a stopcock on the pressure valve above mentioned in the leading tube, and a filling hole with removable cap at the top of the vessel, which is conveniently of short cylindrical form with horizontal axis in which the agitator shaft is mounted. The upper stopcock is closed, the filler cap removed and the contents of the vessel pumped out through the nozzles. The exit cock is then closed, the vessel filled and the filler cap replaced.

It is desirable to make certain that the manifold and leading tubes are filled with liquid before spraying is commenced and it is therefore preferable to use a two-position cock in the tube between the concentrate vessel and the pump, and a bypass tube leading to the supply tank. In one position it permits the pump to draw diluent directly from the supply tank, clearing the tubes of air. Just before the machine reaches the target plot this two-position cock is thrown quickly to the other position, at the same time as a marker is dropped on the land. The pump now commences to discharge liquid from the concentrate tank. Since the tubes and the pump contain themselves an appreciable volume of liquid, initially water, the change over from water to concentrate at the nozzles is not instantaneous, but instead the concentrate builds up rapidly to a concentration which is less than that initially in the concentrate vessel and, after passing through a maximum, declines thereafter approximately exponentially. Since the capacities of the concentrate vessel, pump and attendant tubes are constant in any one machine and the speed of the pump is proportionate to the land speed, the form of the concentration distance function is constant and characteristic and can be determined precisely by spraying a coloured dissolved substance or other substance permitting easy determination of concentration, over a series of sampling vessels.

Since it is convenient when laying down series of experimental plots for the comparable concentrations to lie in the same line, the use of the machine is desirably improved by the introduction of an automatic mechanical switch to operate the bypass valve, that is to say to change over from water spray to concentrate spray. For this purpose a steel bar is inserted in the plot prior to spraying and the vehicle is lined up in its starting position so that, on driving forward, the bar in the plot engages with a suitable trip mechanism and operates the valve automatically.

It is only the descreasing concentration portion of the curve which is of interest and, for economy of chemical and plot space, it is desirable that the initial rise to the peak value should be over as short a distance as possible. This requires that the capacity of pump and attendant tubes should be minimised. Narrow leading tubes are also advantageous in that the time of passage through them occurs over a shorter distance of travel of the machine and therefore any errors in matching the nozzles produce less disturbance of uniformity across the spray band. Since there is a practical limit to the capacity of the pump chamber, a further increase of sharpness can be obtained by transferring the pump to a position between the water supply tank and the concentrate vessel. In this modification a single tube connects the water supply tank to the pump; below the pump, the exit tube branches, one branch going through a stopcock and an assembly of parallel capillary tubes to the concentrate vessel, the other branch by-passing the concentrate vessel and connecting through a two-position cock to the manifold, the other position of this cock connecting the concentrate vessel to the manifold. The only residual volumes now filled with water prior to spraying are those of the two-position cock and manifold in addition to those of the leading tubes which are of less significance because within these tubes very little mixing occurs.

This modification enables a much shorter band of ascending concentration to be obtained, but has the mechanical disadvantage that the concentrate vessel must now operate under pressure and therefore be of stronger construction than is necessary for the first modification. The agitator gland and filler cap must also be capable of withstanding spray pressure without leakage.

In application to field work this machine has the advantage of greater speed of operation as compared with conventional spraying of separate plots with separate mixtures. It has also the convenience that the effect of varying concentration, being drawn as a living graph on the plot, enables comparisons to be made with greater facility. Some plant species in the plot may be observed to be affected over a much longer band than others and the margin of selectivity is therefore very evident and may quickly be reassessed from time to time, some apparently serious initial effects becoming less evident with increasing time and others more so.

To facilitate more exact comparisons of the effect of small differences in active ingredient or formulation, it is an obvious extension of the principle of this machine to have a multiple unit for example a twin unit in which one diluting system feeds the left hand half of a boom and the other the right, the two systems being exactly matched. The effects are now comparable on plots immediately adjacent. In the second modification described above it is necessary for this purpose to duplicate the concentrate vessel, manifolds and nozzles only, a common pump serving both vessels from a common water tank.

The above description relates to the use of the machine for examining the effect of progressive dilution with water of a concentrated spray liquid. It is of course also possible to use another spray liquid in place of water in the supply tank so as to ascertain the effect of varying dosage of one active ingredient in the presence of a constant dosage of another. The machine can also be used for formulation enquiries with one active ingredient, as for example by charging the supply tank with a chosen concentration of active ingredient only and the concentrate vessel with the same liquid plus a high concentration of wetting agent. The band is then sprayed uniformly with active ingredient but with decreasing concentration of wetting agent.

For examining the effect of mixtures of active ingredients, the form of the composition-distance function obtained from the machine described is not the most suitable for biological purposes. The types of mixture generally of most interest will be small concentrations of one in the presence of large amounts of the other or vice versa, it not being known in advance which will be of most interest. A sigmoid rather than an exponential function is therefore desirable. This can be obtained by a simple modification of the machine consisting in replacing the single agitated concentrate vessel by two such vessels in series. Both vessels are initially filled with the desired concentration of one substance and the supply vessel with the desired concentration of the other. The concentration of second substance in the first vessel decreases exponentially, but that in the second vessel, and therefore that sprayed, decreases in a sigmoid manner.

Reference is to be had to the accompanying drawings which show, solely by way of illustration, some embodiments of the present invention.

Fig. 3 is a further embodiment of the spraying apparatus according to the present invention;

Fig. 4 is a representation of the apparatus of the present invention mounted on a vehicle; and Fig. 5 is a modification of the mounting of the apparatus according to the present invention on a vehicle.

Figure 1:
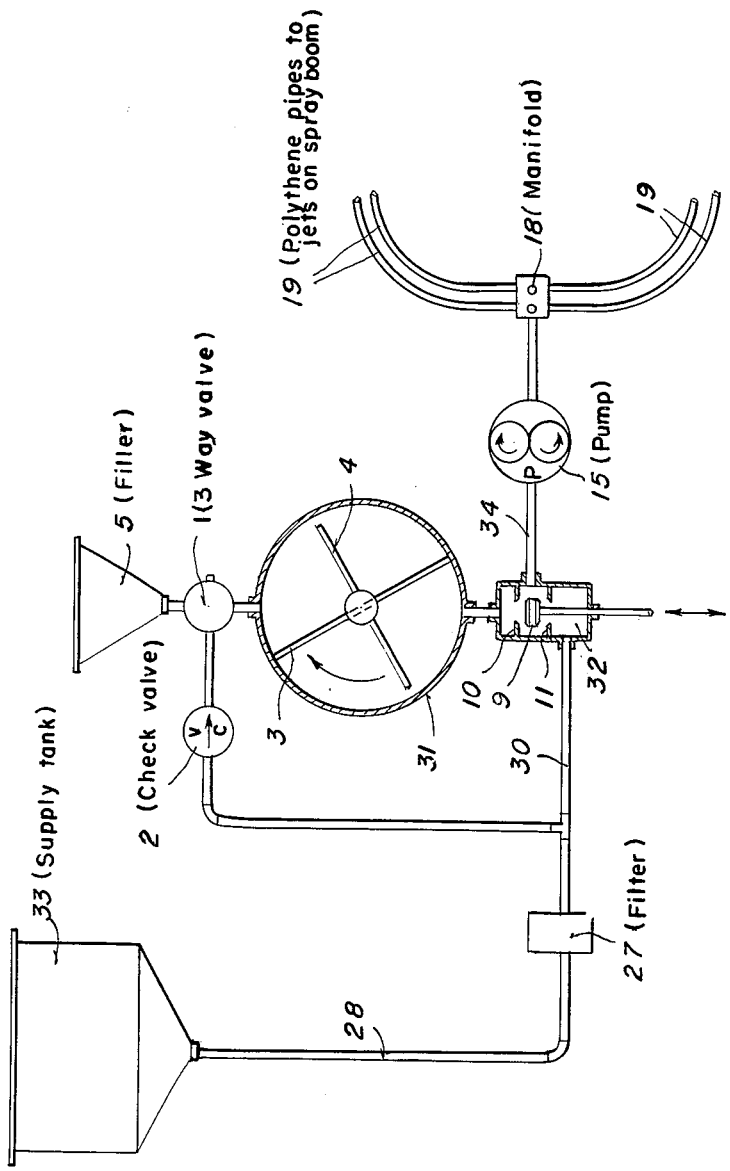
Fig. 1 is a schematic representation of a preferred embodiment of the spraying apparatus according to the present invention.

As seen in Figs. 4 and 5, a wheeled vehicle 40 is provided which has a land wheel 41, and is driven by a motor 42 geared to at least one pair of the wheels of the vehicle. The spray apparatus 43 is mounted on the vehicle and has a pump driving gear 45 protruding therefrom, and spray nozzles 44 on one end of the vehicle.

Figure 1 illustrates the simplest embodiment of the spray apparatus according to the present invention wherein diluent from a supply tank 33 is drawn by pump 15 to concentrate vessel 31 via feed pipe 28, V filter 27, non-return valve 2 and three-position stopcock 1. The liquid in the concentrate vessel 31 is efficiently agitated by means of a stirrer 4, provided with a fixed vane 3. From the concentrate vessel 31 concentrate liquid is pumped via two-seat valve 32 to manifold 18 whence a plurality of polythene tubes 19 of equal length and width deliver the liquid to a spray bar with nozzles (not shown).

When it is desired to renew the liquid in the concentrate vessel the three-way stopcock 1 is set to open the concentrate vessel to the air and close pipe 28. The two-seat valve 32 is set to connect the concentrate vessel with the pump 15 and residual liquid is pumped out of the concentration vessel. Valve 32 is then set to close the concentrate vessel which is filled via filler 5 and three-way cock 1.

It is desirable to fill the manifold 18 and leading tubes 30 and 34 with liquid before spraying is commenced and this is accomplished by setting the valve 32 to connect pump 15 with supply tank 33 at the same time closing concentrate vessel 31. Diluent is then pumped through pipes 30 and 34 to the manifold. The delivery of concentrate is commenced by setting valve 32 to connect the concentrate vessel 31 with the pump 15. To effect a rapid setting of valve 32 a trip mechanism is used which actuates movable valve member 9 to cover an aperture through either polythene washer 10 or 11 which serves as valve seats.

Figure 2:
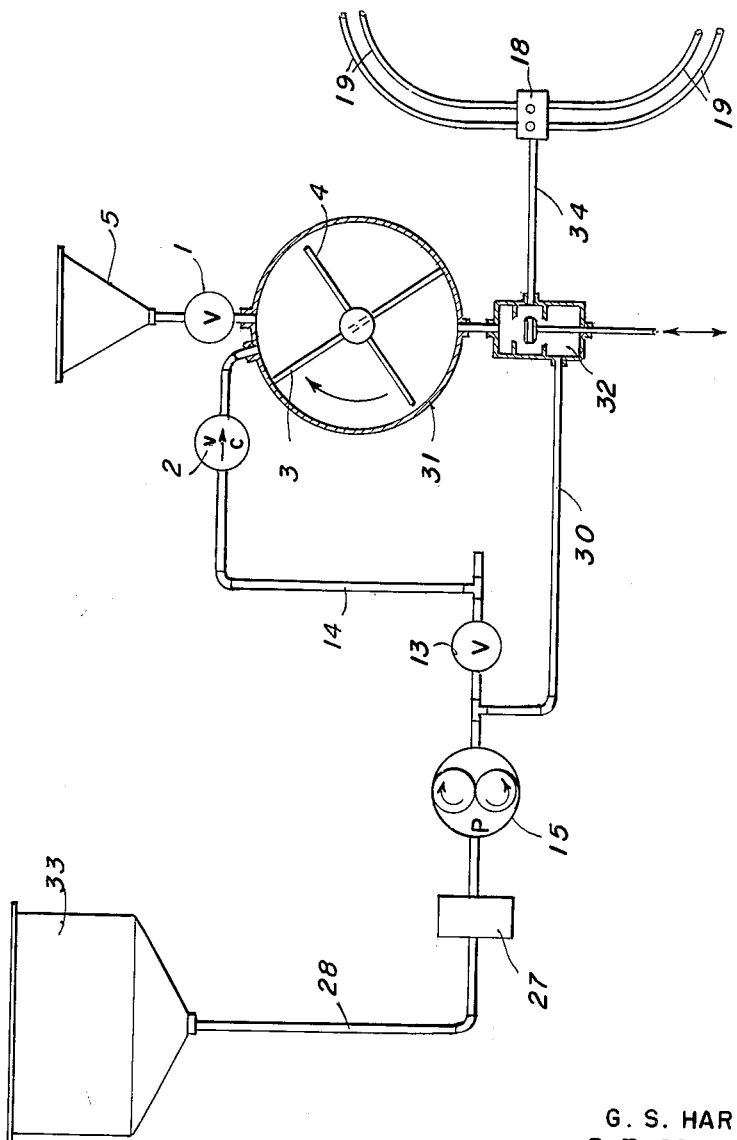
Fig. 2 is a schematic representation of another embodiment of the spraying apparatus according to the present invention.

Figure 2 illustrates a spraying apparatus in which the pump is situated between the supply tank and the concentrate vessel. Prior to commencement of spraying leading tubes 30 and 34 are filled with diluent by closing valve 13 and setting the two-seat valve 32 to close the concentrate vessel 31. When spraying starts valve 13 is opened, the valve 32 is set to connect the concentrate vessel 31 with manifold 18 and diluent is pumped via leading pipe 28 and tube 14 to concentrate vessel 31, the tube 14 being provided with a non-return valve at or near the point of entry to the concentrate vessel. Diluted concentrate liquid is then delivered by pipe 34 to manifold 18 and thence to a spray bar and nozzles (not shown).

Figure 3 illustrates a spraying apparatus incorporating twin concentrate vessels. Diluent from a supply vessel 33 is delivered by pump 15 to a pair of concentrate vessels 31 via tube 14, the tube 14 being provided with a non-return valve at or near the point of entry to the concentrate vessel. Valves 13 and 32 can be set to allow diluent to be pumped into manifold and pipes 34 prior to initiation of the spraying operation. When spraying commences valves 13 are opened and valves 32 set to connect concentrate vessels 31 with manifolds 18. Diluent is then drawn by pump 15 from diluent vessel 33 through tube 14 to concentrate vessels 31, whence diluted concentrate liquid is passed through manifolds 18 to separate spray booms (not shown).

Any one of the embodiments of the spray apparatus can be mounted on the vehicle. As shown in Fig. 4, the pump driving gear 45 can be driven by gearing it by a gearing connection 46 to the land wheel 41. As illustrated in Fig. 5, the pump driving gear 45 can be geared to a power take-off 48 on the motor 42.

We claim:

1. An apparatus and a vehicle on which said apparatus is mounted, said vehicle having a land wheel, said apparatus comprising a first liquid supply tank, a mixing vessel and a pump, said mixing vessel consisting of a substantially airtight chamber provided with a first liquid inlet pipe for filling said mixing vessel having a second liquid inlet therein at the point where it enters said mixing vessel, said first and second liquid inlets having means therein for connecting said second liquid inlet and disconnecting said first liquid inlet with said mixing vessel and connecting said first liquid inlet and disconnecting said second liquid inlet with said mixing vessel, an outlet pipe leading to spray nozzles and an agitator inside the chamber, said first liquid inlet pipe being connected with said first liquid supply tank, said pump being in one of said pipes causing liquid to flow from the mixing vessel through the outlet pipe and at the same time from the first liquid supply tank to the mixing vessel, and being geared to the land wheel of the vehicle.

2. An apparatus and a vehicle on which said apparatus is mounted, said vehicle having a power take-off, said apparatus comprising a first liquid supply tank, a mixing vessel and a pump, said mixing vessel consisting of a substantially airtight chamber provided with a first liquid inlet pipe for filling said mixing vessel having a second liquid inlet therein at the point where it enters said mixing vessel, said first and second liquid inlets having means therein for connecting said second liquid inlet and disconnecting said first liquid inlet with said mixing vessel and connecting said first liquid inlet and disconnecting said second liquid inlet with said mixing vessel, an outlet pipe leading to spray nozzles and an agitator inside the chamber, said first liquid inlet pipe being connected with said first liquid supply tank, said pump being in one of said pipes causing liquid to flow from the mixing vessel through the outlet pipe and at the same time from the first liquid supply tank to the mixing vessel, and being geared to the power take-off of the vehicle.

3. An apparatus and a vehicle on which said apparatus is mounted, said vehicle having a land wheel, said apparatus comprising a first liquid supply tank, a mixing vessel, a pump, a two-seat valve and a manifold provided with tubes leading to spray nozzles, said mixing vessel consisting of a substantially airtight chamber provided with a first liquid inlet pipe for filling said mixing vessel having a second liquid inlet therein at the point where it enters said mixing vessel, said first and second liquid inlets having means therein for connecting said second liquid inlet and disconnecting said first liquid inlet with said mixing vessel and connecting said first liquid inlet and disconnecting said second liquid inlet with said mixing vessel, an outlet pipe and an agitator inside the chamber, said first liquid inlet pipe being connected with said first liquid supply tank, said outlet pipe being connected with said manifold, said two-seat valve being in said outlet pipe, a bypass tube connecting said first liquid inlet pipe and said two-seat valve, said pump being in said outlet pipe between said two-seat valve and said manifold causing liquid to flow from the mixing vessel through the outlet pipe and at the same time from the first liquid supply tank to the mixing vessel, and being geared to the land wheel of the vehicle.

4. An apparatus and a vehicle on which said apparatus is mounted, said vehicle having a power take-off, said apparatus comprising a first liquid supply tank, a mixing vessel, a pump, a two-seat valve and a manifold provided with tubes leading to spray nozzles, said vessel consisting of a substantially airtight chamber provided with a first liquid inlet pipe for filling said mixing vessel having a second liquid inlet therein at the point where it enters said mixing vessel, said first and second liquid inlets having means therein for connecting said second liquid inlet and disconnecting said first liquid inlet with said mixing vessel and connecting said first liquid inlet and dsconnecting said second liquid inlet with said mixing vessel, an outlet pipe and an agitator inside the chamber, said first liquid inlet pipe being connected with said first liquid supply tank, said outlet pipe being connected with said manifold, said two-seat valve being in said outlet pipe, a bypass tube connecting said first liquid inlet pipe and said two-seat valve, said pump being in said outlet pipe between said two-seat valve and said manifold causing liquid to flow from the mixing vessel through the outlet pipe and at the same time from the first liquid supply tank to the mixing vessel, and being geared to the power take-off of the vehicle.

5. An apparatus comprising a first liquid supply tank, a mixing vessel and a pump, said mixing vessel consisting of a substantially airtight chamber provided with a first liquid inlet pipe for filling said mixing vessel having a second liquid inlet therein at the point where it enters said mixing vessel, said first and second liquid inlets having means therein for connecting said second liquid inlet and disconnecting said first liquid inlet with said mixing vessel and connecting said first liquid inlet and disconnecting said second liquid inlet with said mixing vessel, an outlet pipe leading to spray nozzles, and an agitator inside the chamber, said first liquid inlet pipe being connected with said first liquid supply tank and said pump being in one of said pipes causing liquid to flow from the mixing vessel through the outlet pipe and at the same time from the first liquid supply tank to the mixing vessel.

6. An apparatus comprising a first liquid supply tank, a mixing vessel and a pump, said mixing vessel consisting of a substantially airtight chamber provided with a first liquid inlet pipe for filling said mixing vessel having a second liquid inlet therein at the point where it enters said mixing vessel, said first and second liquid inlets having means therein for connecting said second liquid inlet and disconnecting said first liquid inlet with said mixing vessel and connecting said first liquid inlet and disconnecting said second liquid inlet with said mixing vessel, an outlet pipe leading to spray nozzles, and an agitator inside the chamber, said first liquid inlet pipe being connected with said first liquid supply tank and said pump being in said outlet pipe causing liquid to flow from the mixing vessel through the outlet pipe and at the same time from the first liquid supply tank to the mixing vessel.

7. An apparatus comprising a first liquid supply tank, a mixing vessel and an air compressor, said mixing vessel consisting of a substantially airtight chamber provided with a first liquid inlet pipe for filling said mixing vessel having a second liquid inlet therein at the point where it enters said mixing vessel, said first and second liquid inlets having means therein for connecting said second liquid inlet and disconnecting said first liquid inlet with said mixing vessel and connecting said first liquid inlet and disconnecting said second liquid inlet with said mixing vessel, an outlet pipe leading to spray nozzles, and an agitator inside the chamber, said first liquid inlet pipe being connected with said first liquid supply tank causing liquid to flow from the mixing vessel through the outlet pipe and at the same time from the first liquid supply tank to the mixing vessel.

8. An apparatus comprising a first liquid supply tank, a mixing vessel and a pump, said mixing vessel consisting of a substantially airtight chamber provided with a first liquid inlet pipe for filling said mixing vessel having a second liquid inlet therein at the point where it enters said mixing vessel, said first and second liquid inlets having means therein for connecting said second liquid inlet and disconnecting said first liquid inlet with said mixing vessel and connecting said first liquid inlet and disconnecting said second liquid inlet with said mixing vessel, an outlet pipe leading to spray nozzles, and an agitator inside the chamber, said first liquid inlet pipe being connected with said first liquid supply tank, and flow control means being provided in said pipes causing liquid to flow from the mixing vessel through the outlet pipe and at the same time from the first liquid supply tank to the mixing vessel, and said pump being in one of said pipes.

9. An apparatus as claimed in claim 8 in which said flow control means comprises a stopcock in said outlet pipe.

10. An apparatus as claimed in claim 8 in which said flow control means in said connecting pipes comprises a pressure loaded valve and a stopcock in said first liquid inlet pipe and a stopcock in said outlet pipe.

11. An apparatus comprising a first liquid supply tank, a mixing vessel, a pump, and a two-seat valve, said mixing vessel consisting of a substantially airtight chamber provided with a first liquid inlet pipe for filling said mixing vessel having a second liquid inlet therein at the point where it enters said mixing vessel, said first and second liquid inlets having means therein for connecting said second liquid inlet and disconnecting said first liquid inlet with said mixing vessel and connecting said first liquid inlet and disconnecting said second liquid inlet with said mixing vessel, an outlet pipe leading to spray nozzles and an agitator inside the chamber, said first liquid inlet pipe being connected with said first liquid supply tank, said two-seat valve being in said outlet pipe with one portion of said outlet pipe extending from one side of one seat to said mixing vessel and the other portion of said outlet pipe extending from between the seats of said two-seat valve, and a by-pass tube connected between said first liquid inlet pipe and the side of the other seat of said two-seat valve away from said one seat, said pump being in one of said pipes causing liquid to flow from the mixing vessel through the outlet pipe and at the same time from the first liquid supply tank to the mixing vessel.

12. An apparatus as claimed in claim 11 in which said pump is in said outlet pipe between said two-seat valve and said manifold.

13. An apparatus as claimed in claim 11 in which said pump is in said first liquid inlet pipe ahead of said by-pass.

14. A spraying apparatus and a vehicle on which said apparatus is mounted, said apparatus comprising a first liquid supply tank, at least one mixing vessel, said mixing vessel consisting of a substantially airtight chamber provided with a first liquid and a second liquid inlet pipe means with the first liquid inlet pipe means connected to said first liquid supply tank for filling said mixing vessel, said first and second liquid inlets having means therein for connecting said second liquid inlet and disconnecting said first liquid inlet with said mixing vessel and connecting said first liquid inlet and disconnecting said second liquid inlet with said mixing vessel, an outlet pipe means, and means for agitating a liquid in the chamber, and means in one of said pipe means for causing liquid to flow from the mixing vessel through the outlet pipe means and at the same time from the first liquid supply tank to the mixing vessel, said last mentioned means being connected to said vehicle for being driven from said vehicle at a speed proportional to the movement of the vehicle over the ground.

15. An apparatus comprising a first liquid supply tank, at least one mixing vessel, said mixing vessel consisting of a substantially airtight chamber provided with a first liquid and a second liquid inlet pipe means with the first liquid inlet pipe means connected to said first liquid supply tank for filling said mixing vessel, said first and second liquid inlets having means therein for connecting said second liquid inlet and disconnecting said first liquid inlet with said mixing vessel and connecting said first liquid inlet and disconnecting said second liquid inlet with said mixing vessel, an outlet pipe means, and means for agitating a liquid in the chamber, and means in one of said pipe means for causing liquid to flow from the mixing vessel through the outlet pipe means and at the same time from the first liquid supply tank to the mixing vessel.

References Cited in the file of this patent

UNITED STATES PATENTS

| | | |
|---|---|---|
| 1,932,531 | Parker | Oct. 31, 1933 |
| 2,109,384 | Gallupe | Feb. 22, 1938 |
| 2,587,085 | Anderson | Feb. 26, 1952 |
| 2,618,576 | Brown | Nov. 18, 1952 |
| 2,722,453 | Moore | Jan. 1, 1955 |
| 2,740,414 | Moskow | Apr. 3, 1956 |
| 2,740,664 | Yates | Apr. 3, 1956 |

FOREIGN PATENTS

| | | |
|---|---|---|
| 668,246 | Great Britain | Mar. 12, 1952 |